United States Patent
Laude (10) Patent No.: US 8,739,825 B2
(45) Date of Patent: Jun. 3, 2014

(54) DEVICE FOR BURST PIPE SAFETY

(75) Inventor: Juergen Laude, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/404,278

(22) Filed: Feb. 24, 2012

(65) Prior Publication Data

US 2012/0160347 A1 Jun. 28, 2012

Related U.S. Application Data

(63) Continuation of application No. PCT/EP2010/062332, filed on Aug. 24, 2010.

(60) Provisional application No. 61/236,746, filed on Aug. 25, 2009.

(30) Foreign Application Priority Data

Aug. 25, 2009 (DE) .......................... 10 2009 038 780

(51) Int. Cl.
*F17D 1/20* (2006.01)

(52) U.S. Cl.
USPC ...... 137/601.19; 137/460; 137/498; 137/517; 137/601.2; 137/899.2

(58) Field of Classification Search
CPC ................................. F16K 17/30; F16K 17/34
USPC ........... 137/460, 461, 498, 514.5, 514.7, 517, 137/601.19, 601.2, 899.2
See application file for complete search history.

(56) References Cited

U.S. PATENT DOCUMENTS

| 2,411,392 | A | * | 11/1946 | Saville | ........................... 137/498 |
| 3,357,448 | A | | 12/1967 | Martin | |
| 3,424,196 | A | * | 1/1969 | Donner | ........................ 137/504 |
| 3,424,496 | A | | 1/1969 | Prough | |

(Continued)

FOREIGN PATENT DOCUMENTS

| CN | 2833289 | Y | 11/2006 |
| CN | 1987176 | A | 6/2007 |
| DE | 19510586 | A1 | 9/1996 |
| WO | 8302988 | A1 | 9/1983 |

OTHER PUBLICATIONS

German Patent Office, German Office Action Dated Sep. 17, 2010 for German Patent Application No. 10 2009 038 780.3.

(Continued)

*Primary Examiner* — John K Fristoe, Jr.
*Assistant Examiner* — Reinaldo Sanchez-Medina
(74) *Attorney, Agent, or Firm* — Ingrassia Fisher & Lorenz P.C.

(57) ABSTRACT

A device for the protection against the rupture of pipes carrying a fluid includes two or more flow channels and a closing element which interrupts the flow of fluid if a predetermined permissible volume flow is exceeded. At least one of the flow channels can be closed by a test closure in order to increase the flow speed in the remaining flow channels and for test purposes to bring about a movement of the closing element into the closing position. In this way, devices for the protection against the rupture of pipes integrated into complex systems carrying a fluid can be tested in situ to verify their proper functioning.

13 Claims, 4 Drawing Sheets

(56) References Cited

U.S. PATENT DOCUMENTS

| | | | |
|---|---|---|---|
| 3,494,375 A * | 2/1970 | Henaughan | 137/601.13 |
| 4,383,549 A * | 5/1983 | Maldavs | 137/514.7 |
| 4,535,804 A | 8/1985 | Palmgren | |
| 4,605,039 A * | 8/1986 | Johnson et al. | 137/460 |
| 5,099,875 A | 3/1992 | Smietana | |
| 5,799,684 A * | 9/1998 | Cluett | 137/68.15 |
| 6,027,095 A | 2/2000 | Kraft et al. | |
| 6,443,180 B1 | 9/2002 | Samuelson et al. | |

OTHER PUBLICATIONS

International Searching Authority, International Search Report for International Application No. PCT/EP2010/062332 dated Feb. 4, 2011.

State Intellectual Property Office of the P.R.C., Chinese Office Action dated Feb. 26, 2013 for Chinese Patent Application No. 201080038151.6.

* cited by examiner

DEVICE FOR BURST PIPE SAFETY

CROSS-REFERENCE TO RELATED APPLICATIONS

This is a continuation of International Application No. PCT/EP2010/062332, filed Aug. 24, 2010, which claims priority to German Patent Application No. 10 2009 038 780.3, filed Aug. 25, 2009 and to U.S. Provisional Patent Application No. 61/236,746, filed Aug. 25, 2009, the disclosure of which are all hereby incorporated in their entirety by reference.

TECHNICAL FIELD

The technical field relates to a device for ensuring the protection of pipes against rupture, a device for testing a device for the protection of pipes against rupture and also a vehicle having at least one device for the protection of pipes against rupture that is suitable for implementing the process in accordance with the present disclosure.

BACKGROUND

Numerous examples of apparatus and systems containing pipes carrying liquids include a device for protecting pipes against rupture. These can be found in both household appliances, such as washing machines or dishwashers, and also in more technically complex hydraulic systems in aircraft. There, they are also described by the term "hydraulic fuse". These devices prevent fluids from escaping completely through these leakage points. Moreover, where they are used in a hydraulic system in an aircraft, their effect is to bring about an automatic shutdown of a defective pipe branching and to ensure that other consumer units upstream of the protection device can still be supplied with hydraulic fluid.

Such devices for the protection of pipes against rupture usually include an internal closing element that switches automatically into a closed position once a pre-determined volume flow is exceeded, thus preventing any further loss of fluid. However, when used in particular in an aircraft or in any other system where safety is paramount, the problem arises that such protection devices that are incorporated into hydraulic systems cannot be inspected (in situ). Under normal operating conditions, no volume flow can be generated that can close the pipe rupture protection device. In addition, other demands, desirable features and characteristics will become apparent from the subsequent summary and detailed description, and the appended claims, taken in conjunction with the accompanying drawings and this background.

SUMMARY

In one embodiment, this disadvantage is reduced or eliminated altogether, for example, by proposing a device for protecting against pipe rupture, in which a safety inspection can be carried out without the volume flow for the system carrying the fluid exceeding a permissible maximum.

An exemplary device for the protection of pipe rupture includes a housing with an inflow and an outflow, with a closing element that is movably mounted in the housing having a front face facing the inflow and a closing face facing the outflow, having at least two flow channels extending from the inflow to the outflow, with at least one orifice arranged in the flow channels for producing a pressure drop in a fluid flowing from the inflow to the outflow and with at least one retaining element arranged between the outflow and the closing element. A device of this nature may have at least one test closure that closes at least one of the flow channels, so that the resulting flow rate is increased in the remaining flow channels, thereby causing the closing element to move into the closed position.

The basic functioning of such a device is variously described below. The device in accordance with the present disclosure for protecting against pipe rupture is switched in series with a pipeline, so that in normal conditions the fluid being carried flows unimpeded through the device. A housing inside the device having an inflow and an outflow for the fluid contains a movably mounted closing element. This closing element has a front face that faces the inflow. The closing element also comprises a closing face, which faces the outflow. A fluid flowing through the inflow flows through at least two flow channels around the closing unit towards the outflow and exits at this point. In an area between the closing element and the outflow, there is at least one orifice arranged through which the fluid flows. Because of the increased flow resistance, this causes a pressure drop. This pressure drop is essentially quadratically dependent on the volume flow of the fluid. The pressure of the fluid prevailing at the inflow acts on the front face of the closing element, while the pressure prevailing at the outflow behind the orifice through which the flow has passed acts on the closing face of the closing element in the opposite direction. In addition, the force of a retainer element acts on the closing face, which is also positioned facing the inflow or the front face of the closing element.

Under normal conditions, i.e. when the fluid volume flow lies within the normal operating range, an increased force acts on the closing face in such a way that the device in accordance with the present disclosure remains in the open position. The force of the retainer element is calculated in such a way that this additional force increases when a pre-determined maximum volume flow is reached and the force acting on the front face of the closing element corresponds to or slightly exceeds the force acting on the closing face. This results in a movement of the closing element into a closing position.

The force excess on the front face can be explained by the fact that, as mentioned above, the pressure drop through the orifice between the closing face and the outflow is essentially quadratically dependent upon the volume flow. Therefore, as the volume flow increases, the resulting pressure differential between the inflow pressure and the outflow pressure also increases, so that, at a given volume flow, the inflow pressure is sufficiently high in relation to the resetting force acting on the closing face to move the closing element into its closing position.

The number of flow channels within the device in accordance with the present disclosure is neither strictly stated nor limited. However, for the purpose of technical manufacturing simplicity, it could be appropriate to use two or four flow channels. Clearly, there could be three, five, six or more flow channels, which could be combined with a test closure. In a typical use of two flow channels, closing one of the flow channels would have the effect of doubling the flow speed in the other channel and increasing the resulting pressure drop through the orifice by a factor of four. This fluid volume flow between the inflow and the outflow could in itself be sufficient to generate a force excess at the front face and to move the closing element into its closing position.

Unlike conventional devices already known to the state of the art, devices in accordance with the present disclosure may include a test closure arranged in the housing, which can close at least one flow channel in order to increase the resulting volume flow, that is to say the flow speed, in the other flow channels. As a result of the relationship between the flow speed and the pressure drop, the closure of one flow channel will result in a significantly greater pressure drop through the orifice between the inflow and the outflow and produce a force excess at the front face of the closing element, thereby moving the closing element into its closing position. By closing the test closure a state is achieved inside the device in accordance with various embodiments that brings about the closure of the device.

This structurally simple solution is a very effective method of testing the functioning of a device for ensuring the protection of pipes against rupture in situ, without any need to dismantle the system or take it apart. This saves the operator of a safety-relevant system, for example, the operator of an aircraft with at least one safety-relevant hydraulic system or other systems, considerable maintenance costs without having to increase the complexity of the system or the plant.

In order to prevent a situation in which, because of any dynamic effects from the rapid opening and closing of valves or the like, the device in accordance with the present disclosure may briefly close, the closing element can be movably housed in a bushing section within the housing, so that sufficient fluid may flow into the bushing section to maintain the constancy of the volume so as to actuate the closing element. This flow of fluid can be limited by a cover for the bushing section arranged on the front side of the closing element having an integrated choke directed towards the inflow, so that the movement of the closing element is damped. When the maximum volume flow is reached or exceeded and a force excess is present at the front face, the closing element is forced into its closing position, whereby the space formed between the closing element and the cover slowly fills with fluid thus limiting the speed of the closing element. In this way, pressure or flow peaks can be absorbed.

It is conceivable that a number of test closures could be provided for a number of flow channels, so that two or more test closures would need to be closed in order to be able to conduct a functioning test.

In a particularly advantageous embodiment, the test closure is movably arranged on the housing so that by moving it into a closing or an opening position, the flow channel is correspondingly closed or opened.

In a further embodiment, the test closure could be mounted in such a way that it can be rotated and include a closing face, which closes in such a way that it is flush with a surrounding wall of the respective flow channel and in a closing position closes the respective flow channel. The closing position could be achieved by starting from the closing position with a rotation of the test closure through an angle of rotation of 180°.

In a further embodiment, it could be an advantage that the test closure can be deflected longitudinally into the respective flow channel, so that—for example—a closing or opening of the respective flow channel can be effected by pressing or pulling. For this purpose, the test closure could be spring-mounted and could be released again once the closing position of the closing element has been reached.

In another embodiment, the test closure is so designed that a colored warning sign is visible when it is in its closing position, thus giving a warning before the device is used.

It is also conceivable that the test closure could be operated and locked without being activated, possibly for safety reasons or because under pressure the forces required to activate it were too high. At the end of the test, the device would need to be reset by hand. The special tool required for this purpose could be marked for example with an elongated red warning flag, as is customary in aviation.

Moreover, it could be especially advantageous if the test closure were mechanically constructed in such a way that it could only be switched into a closing position by using a special tool and this special tool could only be removed from the test closure if the latter is in an opening position. This would be especially effective in preventing an involuntary closing of the test closure.

A process for the testing of a device for the protection of pipes against rupture is also disclosed, which comprises the steps for operating the higher level system, for closing at least one test closure, for closing down the entire system when the closing position of the closing element is reached, and a final optional operation of the higher level system.

A device is also provided for protecting pipes against rupture in an aircraft and also by an aircraft having at least one hydraulic system and at least one device in accordance with the present disclosure for the protection of pipes against rupture.

BRIEF DESCRIPTION OF THE DRAWINGS

Further features, advantages and possible applications of the present disclosure will become apparent from the following description of the different embodiments and the drawings. At the same time, all features that are described and/or depicted in the drawings may be used both individually and in any combination in the context of the present disclosure regardless of the manner in which they are presented in the individual claims or of their retroactive applications. The drawings also contain the same reference symbols for the same or similar objects.

DETAILED DESCRIPTION

Figure 1:
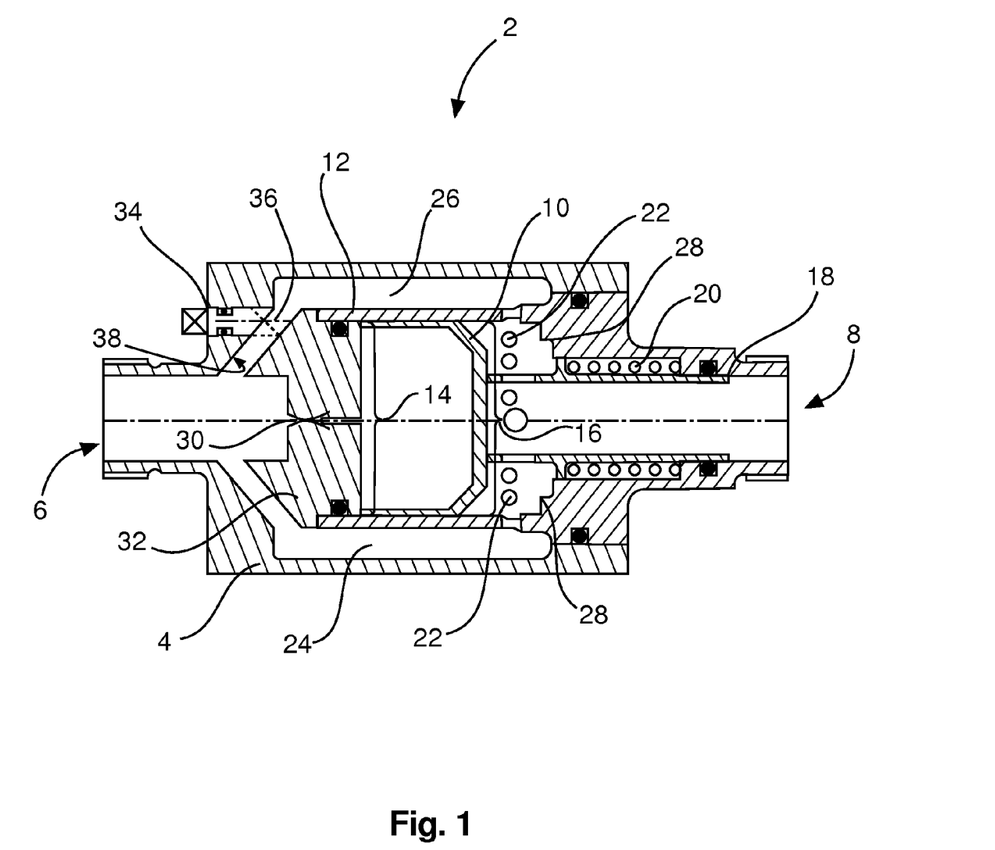
FIG. 1 is an illustration of a device in accordance with an embodiment in a lateral sectional view.

FIG. 1 shows a lateral section of a device in for the protection of pipes against rupture 2, which includes a housing 4 having an inflow 6 and an outflow 8, a locking element 10 that is arranged in a movable manner in a bushing section 12, a front face 14 and a closing face 16. In the housing 4, there is also a retaining element 18, which is supported through a spring 20 against the housing in the vicinity of the outflow. Between the locking element 10 and the retaining element 18 there are number of orifices 22, which produce a pressure drop in one of the fluids flowing from the inflow 6 to the outflow 8.

Between the inflow 6 and the orifices 22, two flow channels 24 and 26 can be seen in this drawing, although more flow channels can also be arranged in the housing 4. If fluid flows through the inflow 6 into the two flow channels 24 and 26, it passes through the orifices 22 and in so doing it undergoes a pressure drop. Effectively, this pressure drop increases quadratically in relation to the flow speed within the flow channels 24 and 26 with the result that, for example, if the volume flow is doubled, a four-fold pressure drop can be expected through the orifices 22.

Along the plane of the drawing, the locking element 10 can move to the right towards the outflow 8, whereby, when it reaches the edges 28, it reaches a closing position in which the orifices 22 are closed, so that the flow of fluid between the inflow 6 and the outflow 8 is completely interrupted. The movement of the locking element 10 into this closing position is brought about by the increasing pressure difference between the pressure level at the inflow 6 and the pressure level at the outflow 8. If the force at the front face 14 of the locking element 10 exceeds the resetting force acting on the closing face 16 produced by the pressure at the outflow 8 and the spring 20, the closing element is forced into its closing position. This position may be left again if the fluid pressure is interrupted at the inflow 6.

For compensating pressure or flow peaks caused by rapid opening and closing movements of valves or the like in a hydraulic system, a cover 32 comprising a choke system is arranged on the bushing section 12. If the locking element 10 is forced into its closing position, the hollow space located between the locking element 10 and the cover 32 must fill up with fluid in order to preserve the volume constancy in order to permit a movement of the locking element 10. The choke 30 can be designed in such a way that a damping effect on the movement of the locking element 10 can be achieved very easily and, in an ideal case, this can compensate for pressure or flow peaks at the inflow 6.

In order to enable the device in accordance with the present disclosure to be tested, a test closure 34 is arranged on the housing 4 which can close the upper flow channel 26. This is effected by the test closure 34 having a closing face 36, which in an opening position of the test closure lies flush with a wall 38 of the flow channel. When the test closure 34 is rotated in its opening position through 180° through its own axis, the closing face 36, depending on the corresponding geometric design of the test closure, turns in such a way that the flow channel 26 is completely closed. For this purpose, the flow channel 26 could have a section, the central axis of which forms an angle of 45° with the longitudinal axis of the device in accordance with the present invention, so that the closing face 36 is also at an angle of 45°. When rotated through an angle of 180°, the closing face 36 extends vertically to the wall 38 and then covers the entire cross-section of the respective flow channel 26.

If the test closure 34 is moved into a closing position, the volume flow in the upper flow canal 26 comes to an end, with the result that the entire fluid flow passes through the lower flow channel 24. This assumes that the device 2 comprises only two flow channels, 24 and 26. The pressure loss at the orifices 22 increases by a factor of four because the flow speed has now doubled. Given an appropriate design of the spring force, this significantly higher pressure loss could be sufficient to build up a force excess at the front face 14 of the locking element 10, leading to the locking element 10 being moved into its closing position.

The drawing is only intended to be an example, so that the number of flow channels arranged in the housing 4 could be increased. Similarly, any number of test closures could be distributed along the flow channels and these could even function on the basis of different operating principles. In this way, test closures could be imagined that are pressed into a corresponding flow channel 22.

Figure 2:
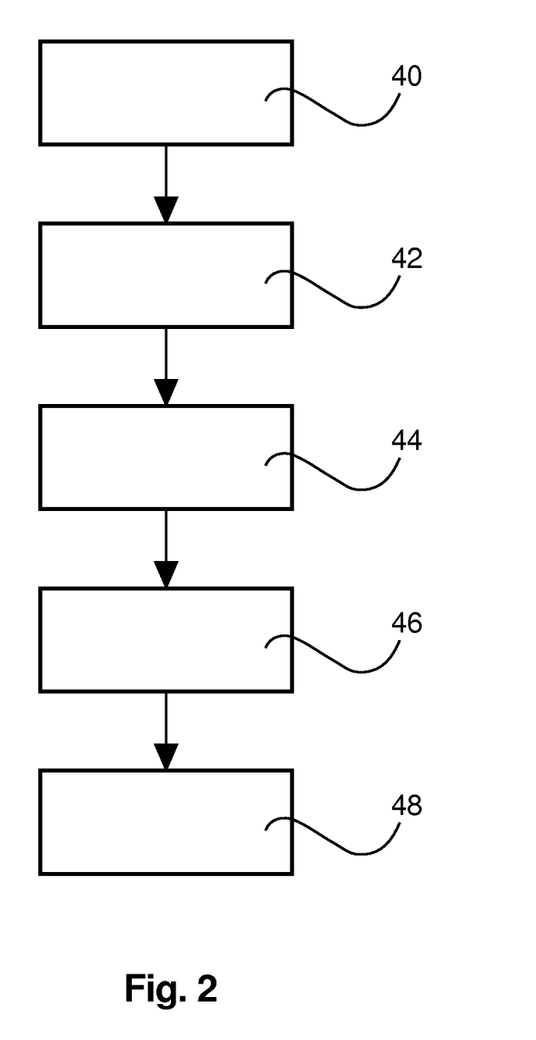
FIG. 2 is an illustration of the process in accordance with an embodiment in a schematic block diagram.

FIG. 2 illustrates an exemplary method in accordance with an embodiment in the form of a block diagram. After the initiation 40 of the operation of a higher level system, for example a hydraulic system, all existing test closures 34 will be closed 42 one after another and the reaction of all devices 2 that are arranged in the higher level system will be tested 44. After this test has been completed, the operation of the higher level system will be interrupted 46, so that the locking element 10 of each of the devices 2 will be moved in the direction of the inflow 6. Subsequently, a new initiation 48 of the operation of the higher level system can take place.

Figure 3:
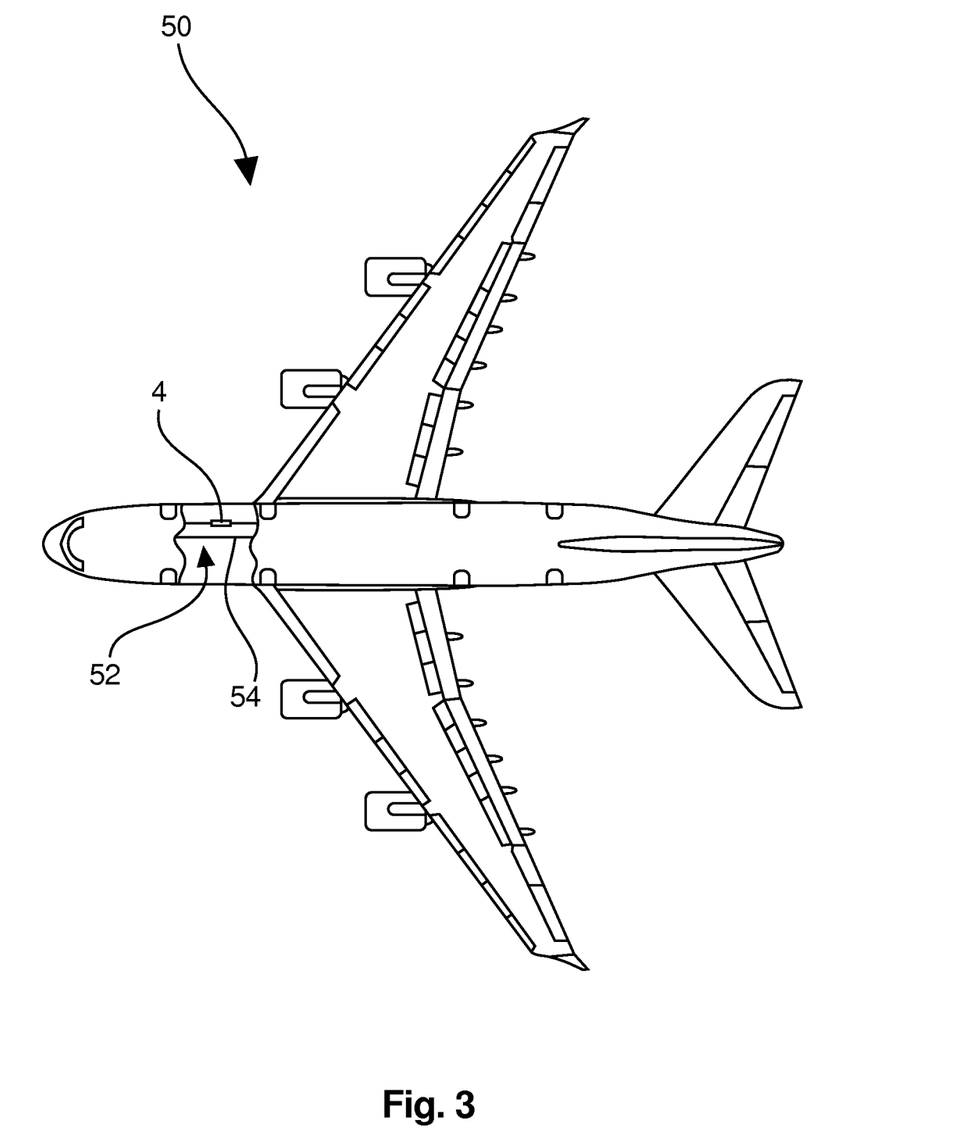
FIG. 3 is an illustration of an aircraft having at least one hydraulic system and at least one integrated device in accordance with an embodiment for the protection of pipes against rupture.

Furthermore, FIG. 3 shows an aircraft 50 that is equipped with at least one hydraulic system 52, on the pipe system of which 54 a device for the protection of pipes against rupture in accordance with one embodiment has been arranged.

Figure 4A:
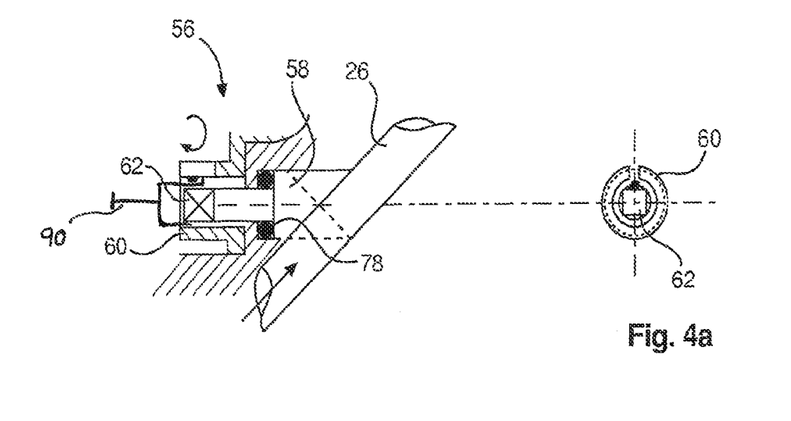
FIGS. 4a to 4c show various exemplary test closures.

FIG. 4a illustrates a test closure 56 having a bevelled and rotatably mounted closing body 58, which can be rotated into either an opening or a closing position. This principle corresponds to the test closure 34 shown in FIG. 1. A further special feature is a slotted bushing 60, which protects an operating end 62 of the test closure 56 from any unauthorized or unintentional operation. With the use of an appropriate tool 90, the operating end 62 can be engaged and the test closure 56 can be operated. In one example, the test closure 56 is constructed in such a manner that it can only be brought into a closing position through the use of the special tool 90 and this special tool 90 can only be removed when the test closure 56 is in an opening position.

Figure 4B:
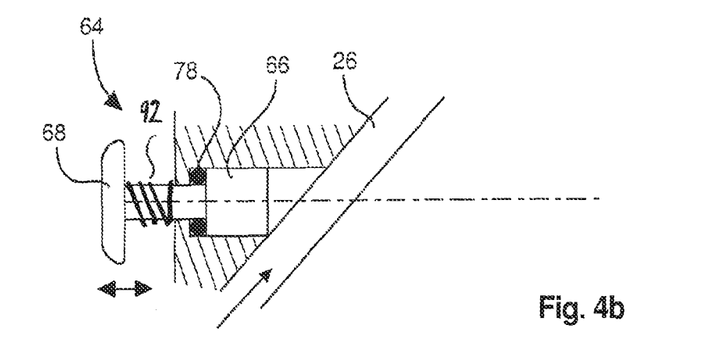

FIG. 4b shows a further possible test closure 64, which has a closing element 66 that can be pressed into position. The test closure 64 can be operated by an operating end 68 in the form of a button, for example. In one example, the test closure 64 is spring-mounted with a spring 92 and without any external influence reverts independently from its closing position to its opening position.

Figure 4C:
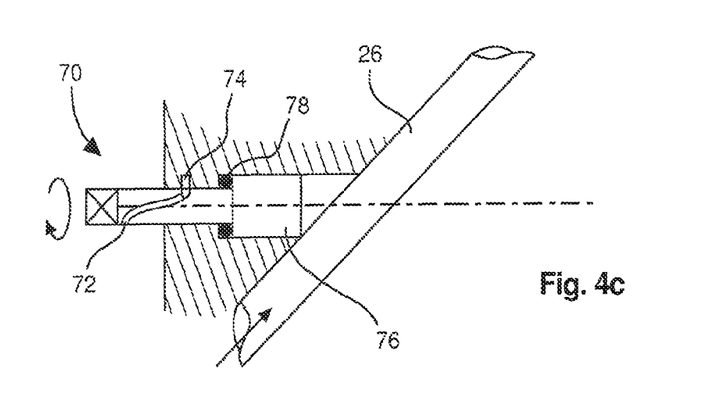

Furthermore, FIG. 4c shows an addition test closure 70, which, by being rotated over a milled recess 72, into which a pin 74 engages, pivots a closing element 76 in an axial direction.

All these examples are to be understood as being exemplary. It is understood that appropriate sealing rings 78 or the like are used for sealing purposes.

Finally, it must be stressed that the terms "comprising" are not intended to preclude other elements or steps and that "a" or "an" do not preclude a plural form. It is also stressed that features or steps, described by means of references to one of the above embodiments, can also be used in combination with other features or steps of other embodiments described above. Reference marks contained in the claims are not to be seen as being a limitation. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A hydraulic fuse, comprising:
   a housing with an inflow and an outflow;
   a closing element mounted in a movable manner in the housing with a front face facing the inflow and a closing surface facing the outflow;
   at least two flow channels extending from the inflow to the outflow;
   at least one orifice, arranged in the flow channels to create a pressure drop in a fluid flowing from the inflow to the outflow; and
   at least one retainer element arranged between the outflow and the closing element;
   wherein an inflow pressure of the fluid at the inflow acts on the front face of the closing element and an outflow pressure of the fluid at the outflow acts on the closing surface of the closing element; wherein the retainer element is dimensioned in such a way that, at a predetermined minimum difference between the inflow pressure and the outflow pressure, the closing element moves against a retaining force from the retainer element towards the outflow into a closing position; and wherein the hydraulic fuse further comprises at least one test closure for in-situ testing of the hydraulic fuse, the at least one test closure biased in an opening position, and the at least one test closure closes at least one of the flow channels in a closing position, so that the flow speed in the other flow channels is increased, the pressure drop through the orifice increases, and a movement of the closing element is thus induced.

2. The hydraulic fuse of claim 1, further comprising a bushing section closed by a cover of the housing;

wherein the closing element is mounted in a movable manner in the bushing section, and the cover comprises a choke to choke the flow of fluid.

3. The hydraulic fuse claim 2, wherein the test closure is arranged on the housing and, by moving the test closure into a closing or an opening position, an opening or a closing of the flow channel takes place.

4. The hydraulic fuse of one of claim 3, wherein the test closure is mounted in a rotatable manner and comprises a closing face, which in an opening position fits flush against a surrounding wall of the respective flow channel and in a closing position closes the respective flow channel.

5. The hydraulic fuse of claim 3, wherein the test closure is configured to be deflected longitudinally into the respective flow channel for closing.

6. The hydraulic fuse of claim 3, wherein the test closure is spring-mounted and without any external influence reverts independently from its closing position to its opening position.

7. The hydraulic fuse of claim 6, wherein the test closure is constructed in such a manner that a colored warning signal is clearly visible in a closing position.

8. The hydraulic fuse of claim 7, wherein the test closure is constructed in such a manner that it can only be brought into a closing position through the use of a special tool and this special tool can only be removed when the test closure is in an opening position.

9. The hydraulic fuse of claim 3, wherein the pipes are in an aircraft.

10. The hydraulic fuse of claim 3, wherein the test closure is configured to revert independently, without any influence external to the hydraulic fuse, from its closing position to its opening position.

11. An aircraft comprising at least one hydraulic system, at least one hydraulic pipe system, and at least one hydraulic fuse that is capable of being tested in situ for proper functioning, comprising:

a housing with an inflow and an outflow;

a closing element mounted in a movable manner in the housing with a front face facing the inflow and a closing surface facing the outflow;

at least two flow channels extending from the inflow to the outflow;

at least one orifice, arranged in the flow channels to generate a pressure drop in a fluid flowing from the inflow to the outflow; and at least one retainer element arranged between the outflow and the closing element;

wherein an inflow pressure of the fluid at the inflow acts on the front face of the closing element and an outflow pressure of the fluid at the outflow acts on the closing surface of the closing element;

wherein the retainer element is dimensioned in such a way that, at a predetermined minimum difference between the inflow pressure and the outflow pressure, the closing element moves against a retaining force from the retainer element towards the outflow into a closing position; and wherein the device further comprises at least one test closure biased in an opening position and configured to close at least one of the flow channels so that the flow speed in the other flow channels is increased, the pressure drop through the orifice increases, and a movement of the closing element is thus induced.

12. The aircraft of claim 11, wherein the test closure is configured to revert independently, without any influence external to the hydraulic fuse, from its closing position to its opening position.

13. A method for in situ testing a hydraulic fuse in a system through which fluid flows, the hydraulic fuse having at least one test closure, the method comprising:

initiating operation of the system, the system including a housing with an inflow and an outflow, a closing element mounted in a movable manner in the housing, at least two flow channels extending from the inflow to the outflow and at least one orifice arranged in the flow channels to create a pressure drop in a fluid flowing from the inflow to the outflow;

closing at least one flow channel in the hydraulic fuse by moving the at least one test closure into a closed position, the at least one test closure biased in an opening position;

responsive to the closing, the at least one flow channel in the hydraulic fuse is closed so that the flow speed in the other of the flow channels of the hydraulic fuse is increased and the pressure drop through the orifice increases; and establishing that the hydraulic fuse operates correctly, if the pressure drop causes the closing element to move relative to the housing to shut off the fluid flow through the hydraulic fuse.

\* \* \* \* \*

UNITED STATES PATENT AND TRADEMARK OFFICE
CERTIFICATE OF CORRECTION

| | | |
|---|---|---|
| PATENT NO. | : 8,739,825 B2 | Page 1 of 1 |
| APPLICATION NO. | : 13/404278 | |
| DATED | : June 3, 2014 | |
| INVENTOR(S) | : Juergen Laude | |

It is certified that error appears in the above-identified patent and that said Letters Patent is hereby corrected as shown below:

On the Title Page, Item (54), Title, "DEVICE FOR BURST PIPE SAFETY" should be changed to --HYDRAULIC FUSE--

Signed and Sealed this
Seventeenth Day of February, 2015

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,739,825 B2 | Page 1 of 1 |
| APPLICATION NO. | : 13/404278 | |
| DATED | : June 3, 2014 | |
| INVENTOR(S) | : Juergen Laude | |

It is certified that error appears in the above-identified patent and that said Letters Patent is hereby corrected as shown below:

On the Title Page, Item (54), and in the Specification, Column 1, line 1, Title, "DEVICE FOR BURST PIPE SAFETY" should be changed to --HYDRAULIC FUSE--

This certificate supersedes the Certificate of Correction issued February 17, 2015.

Signed and Sealed this
Tenth Day of March, 2015

Michelle K. Lee
*Deputy Director of the United States Patent and Trademark Office*